FLAME FAILURE CONTROL FOR A VAPOR GENERATOR BURNER SYSTEM

Original Filed Nov. 29, 1962 3 Sheets-Sheet 1

INVENTORS:
JACK A. SCHUSS
VIRGINIUS Z. CARACRISTI
BY John F. Carney
ATTORNEY

FLAME FAILURE CONTROL FOR A VAPOR GENERATOR BURNER SYSTEM

Original Filed Nov. 29, 1962 3 Sheets-Sheet 2

INVENTORS:
JACK A. SCHUSS
VIRGINIUS Z. CARACRISTI
BY John F. Carney
ATTORNEY

FLAME FAILURE CONTROL FOR A VAPOR GENERATOR BURNER SYSTEM

Original Filed Nov. 29, 1962 3 Sheets-Sheet 3

INVENTOR.
JACK A. SCHUSS
VIRGINIUS Z. CARACRISTI
BY
John F. Carney
ATTORNEY

United States Patent Office

Re. 26,167
Reissued Mar. 7, 1967

26,167

FLAME FAILURE CONTROL FOR A VAPOR GENERATOR BURNER SYSTEM

Jack A. Schuss, Hartford, and Virginius Z. Caracristi, West Hartford, Conn., assignors to Combustion Engineering, Inc., Windsor, Conn., a corporation of Delaware Original No. 3,195,610, dated July 20, 1965, Ser. No. 240,797, Nov. 29, 1962. Application for reissue Nov. 23, 1965, Ser. No. 522,337
12 Claims. (Cl. 158—28)

**Matter enclosed in heavy brackets [ ] appears in the original patent but forms no part of this reissue specification; *matter printed in italics indicates the additions* made by reissue.**

The present invention relates to a novel burner control system for a vapor generator. More particularly, the invention relates to a system for controlling the admission of fuel to the burners of a vapor generator only at such times that sufficient ignition energy exists as will ignite the fuel.

In the operation of a vapor generator there exists the danger of admitting fuel to the burners and thence into the furnace chamber when there is no flame with which to provide sufficient ignition energy to ignite and burn the fuel thereby resulting in the creation of a furnace atmosphere which is highly explosive. To insure the safe operation of a vapor generator, it is necessary to provide some means for preventing the establishment of an explosive atmosphere within the furnace chamber.

With the advent of larger vapor generators capable of creating greater amounts of vapor and the tendency of operating vapor generators on a completely automated basis, the problem of safe operation is increased. In the first place, larger vapor generators require a greater number of burners for producing heat of combustion and a concomitant greater volume of fuel to be burnt. The increase in the number of burners and the volume of fuel admitted to the furnace thus enhances the explosive potential of the generator thereby requiring means to constantly monitor the burner system to insure that a flame exists to burn all of the fuel admitted to the burners and to take the appropriate steps to discontinue the admission of fuel to the burners when the flame at the burners or within the furnace chamber for some reason becomes extinguished. On the other hand, the introduction of completely automatic means to oversee the operation of a vapor generator makes it necessary to insure that these means function properly such that an explosive condition cannot exist within the furnace. The utilization of automatic control means removes the operation of the vapor generator from the hands of an operator and relies solely on the proper functioning of the various components employed in the control system organization. This fact could have a tendency to reduce the economy of operation of the generator by making possible the occurrence of so-called "nuisance shutdown," or those shutdowns instigated by a malfunction of one of the control system components rather than by the condition of the furnace.

The herein disclosed invention contemplates providing a completely automated control system which will continuously monitor the burners and will discontinue the admission of fuel thereto immediately upon its becoming evident that there is insufficient flame with which to burn the fuel admitted to the furnace chamber and thereby prevent the creation of an explosive atmosphere therein. The system is so organized as to require the concurrence of two independently operable flame monitoring means which monitor different aspects of burner firing before the vapor generator can be shut down thereby tending to eliminate the occurrence of nuisance shutdowns.

The control system is operative during three principal phases of burner operation to maintain the furnace chamber in a non-explosive condition. During the first phase, i.e. startup of the burners, means are operative to prevent the admission of fuel to each of the burners on an individual basis until the igniters associated with each of the burners exhibit sufficient ignition energy with which to insure ignition to the burners thereby obviating the danger of admitting fuel to burners whose igniters are in operation but which operation is not sufficient to ignite the burners. The means employed comprises pressure differentiating means associated with the igniters which are capable of determining the magnitude of ignition energy available at the igniter and, when a sufficient amount of ignition energy is present, actuating the fuel supply valve associated with the burner to its open position. This phase of control continues until the supply valve reaches its full open position at which time the second phase of burner control is initiated. This second phase involves the determination of whether or not the fuel supply valve should be permitted to remain open. The means provided for such determination include the same igniter pressure differential sensing device which operates in conjunction with an optical flame sensor arranged to view the existence or nonexistence of flame at the mouth of the burner. The optical flame is operable independently of the igniter pressure differential sensing means and serves to back up or augment the operation of the former thereby permitting its removal from service for maintenance purposes without having to shut down the burner. The third phase of control is initiated when the flame developed within the furnace chamber by the operation of the burner system is sufficiently large to reignite any of the burners which would happen to lose their source of independent ignition energy. During this phase of operation all of the igniter pressure differential sensing means and the optical flame scanners are so organized as to integrate the monitoring of each of the burners on an overall furnace chamber basis. During this phase the control system is arranged to discontinue the admission of fuel to all of the burners simultaneously, such discontinuation occurring only when both groups of flame sensing means register the nonexistence of flame at a sufficient number of burners to demand shutdown of the generator.

In the herein illustrated vapor generator the burner system comprises three burner elevations each consisting of four burners. The point of hazardous operation of such a vapor generator is considered to be that point where there is a total absence of flame within the furnace chamber or where all of the burners of each elevation show no flame. However, the present control system presupposes the possibility of a portion of the monitoring system failing on the unsafe side, i.e. registering the presence of flame when, in fact, none exists and so instates a factor of safely in the control of the burner system by considering each burner elevation to be inoperative when any three of the four burners which comprise the elevation show no flame.

The invention is predicated upon the existence of two completely independent flame monitoring systems, one of which monitors the igniters employed to provide ignition energy for the fuel which issues from each burner and the other of which is a line of sight device which oversees the flame condition existing at the mouth of the burner itself. While the former is associated with the igniters and not with the burners themselves, it remains a valid means for determining the flame condition existing at the burners since it is a pressure differential sensing device which is capable of determining whether sufficient ignition energy exists at the igniter to ignite the burners when fuel is admitted thereto. Therefore, by deduction, if fuel is admitted to the burners and the igniters exhibits sufficient ignition energy to ignite the fuel, there must be a flame existing at the burner.

Because of the special interrelationship between the two flame monitoring systems during the third phase of burner operation, a vapor generator, once put in operation, cannot have its operation discontinued until such time as the furnace conditions demand a cessation of operation as proven by a concurrence of the two monitoring systems. This feature lends itself to the development of a more dependable generator control system since the possibility of experiencing a shutdown instigated by failure of one of the components of the control system rather than by the nonexistence of a flame within the furnace is virtually eliminated. Each of the monitoring systems, in effect, oversees the operation of the other and effects a shutdown of the generator only when both of the systems experience the nonexistence of flame thereby reducing the possibility of having "nuisance shutdowns" which, in turn, results in a reduction of the expense and annoyance of having to remove a generator from service merely because of a malfunction in the control system.

In addition to reducing the expense and annoyance caused by "nuisance shutdowns," there is also eliminated one of the hazards of generator operation during the occurrence of which it has been shown that explosions are most apt to occur. This condition is that which exists during the startup of a vapor generator where, due to the instability of the furnace atmosphere, the explosive potential of the generator is at its highest. By reducing the number of times the vapor generator is compelled to shut down the number of times it must pass through the startup cycle is also reduced thereby enhancing the safe operation of the unit.

It is therefore an object of the present invention to provide a control system for an automated vapor generator which is capable of dependably monitoring the flame condition existing within a furnace chamber and initiating measures to prevent the creation of an explosive atmosphere therewithin.

Another object of the invention is to provide a control system for an automated vapor generator which will not occasion a shutdown of the generator because of a malfunction in a portion of the system itself but will instigate measures to discontinue the admission of fuel to the furnace only when the furnace conditions themselves require such discontinuation.

An additional object of the invention is to provide a control system for an automated vapor generator which will discontinue the admission of fuel to the furnace even though a portion of the flame monitoring system malfunctions in a manner which would tend to maintain continued fuel admission.

A still further object of the invention is to provide an automatic control system for a vapor generator which is structurally simple yet operably dependable.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawings wherein.

Figure 1:
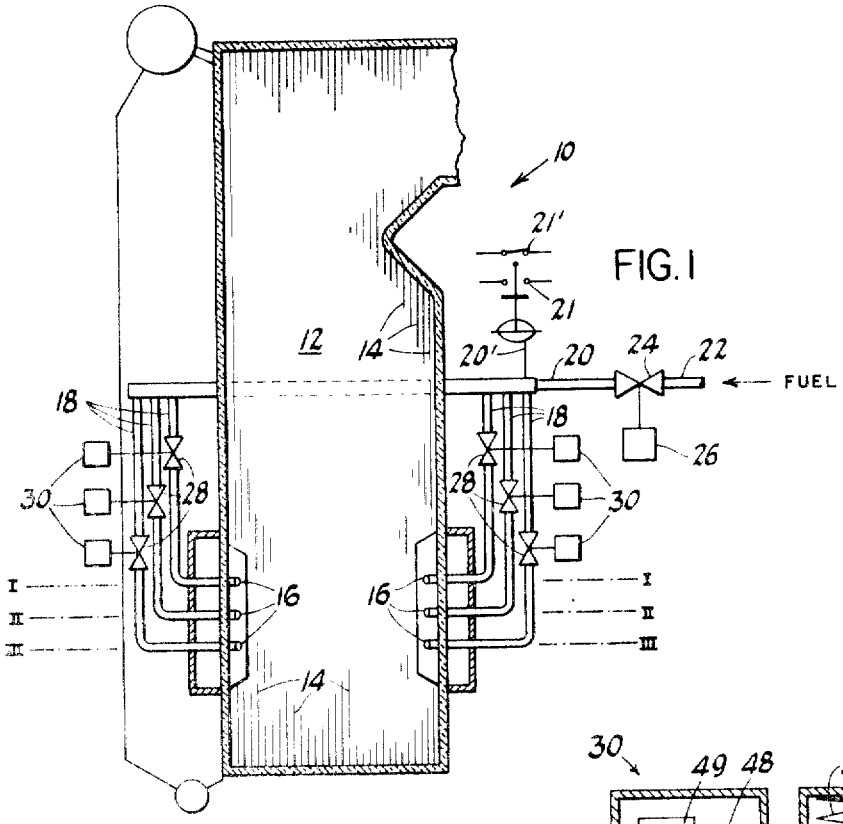
FIG. 1 is a diagrammatic illustration of a vapor generator of the type intended to employ the instant invention.

Referring now to the drawings there is shown in FIG. 1 a vapor generator 10 comprising a furnace chamber 12 having outer walls lined with upright vapor generating and wall cooling tubes 14 which are interconnected in fluid circulation whereby a vaporizable liquid, most commonly water, is transformed into vapor by the addition of heat extracted from combustion gases generated in the furnace chamber. Burners 16 are positioned at spaced points about the furnace chamber 12 and are supplied with fuel by means of fuel supply lines 18 which connect the burners with a supply source (not shown) through a main header 20 and main fuel line 22. The main header contains a pressure switch 20' which is actuated upon experiencing a fuel pressure within the system which represents substantially 30 percent of rated fuel pressure for the burners. In the main fuel line 22 between the main header 20 and the supply source is located a main supply valve 24 having an electrically actuated valve operator 26 which controls the admission of fuel to the main header 20 and thence to the supply lines 18. Fuel supply valves 28 are provided in the lines 18 to control the admission of fuel to each burner 16. These valves 28 have operators 30 which effect a slow opening but rapid closing of the lines 18.

Figure 3:
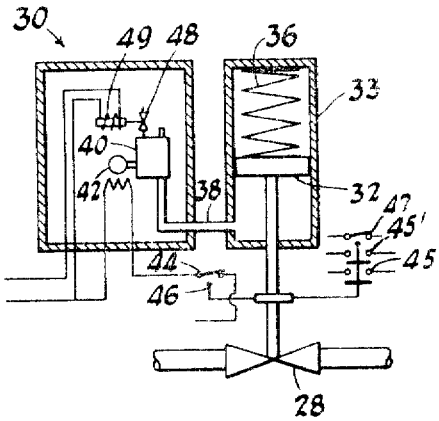
FIG. 3 is a schematic representation of a fuel supply valve employed in the present invention.

A typical valve of this type is shown in FIG. 3. Its actuator 30 comprises a hydraulically actuated piston 32 which is operable within a cylinder 33 and which operates a valve stem 34 against the force of a spring 36 by means of fluid pressure. Fluid is supplied to the underside of the piston 32 through inlet line 38 by means of a pump 40 which is driven by an electric motor 42. A normally closed limit switch 44 is interposed in the motor's power line and operates to discontinue operation of the motor once the valve stem 34 has reached its uppermost position thereby indicating that the valve 28 is open. The switch 44 is opened by means of an arm 46 which is attached to the valve stem 34. A pressure relief valve 48 operated by a solenoid 49 is associated with the pump 40 such that fluid pressure admitted to the cylinder 33 remains to maintain the valve 28 in its open position after operation of the pump motor 42 has been discontinued until such time as the solenoid 49 is actuated to open the relief valve 48 thereby venting the fluid beneath the piston 32 and permitting the valve stem 34 to descend under the force of spring 36 to rapidly close the valve 28.

Figure 2:
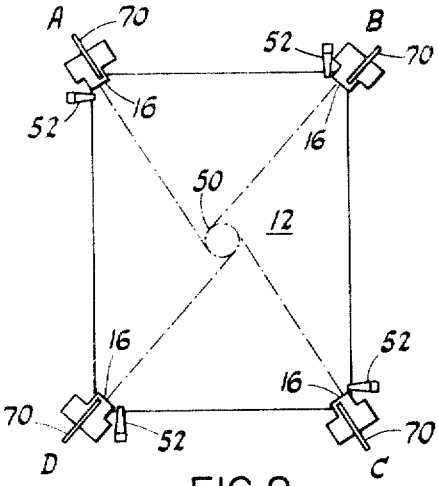
FIG. 2 is a diagrammatic cross-sectional plan view of the furnace chamber of the generator shown in FIG. 1.

The vapor generator 10 comprises a plurality of burner elevations, designated as I, II and III, which may be operated singly or in unison depending on the load requirements of the generator. Each elevation consists of four burners 16, each of which is located in one of the four corners of the furnace 12 for discharging streams of fuel and air for burning in directions tangential to an imaginary firing circle 50 as shown in FIG. 2. For the sake of clarity the burner assemblies at each of the corners of the furnace 12 have been designated as A, B, C and D.

Figure 4:
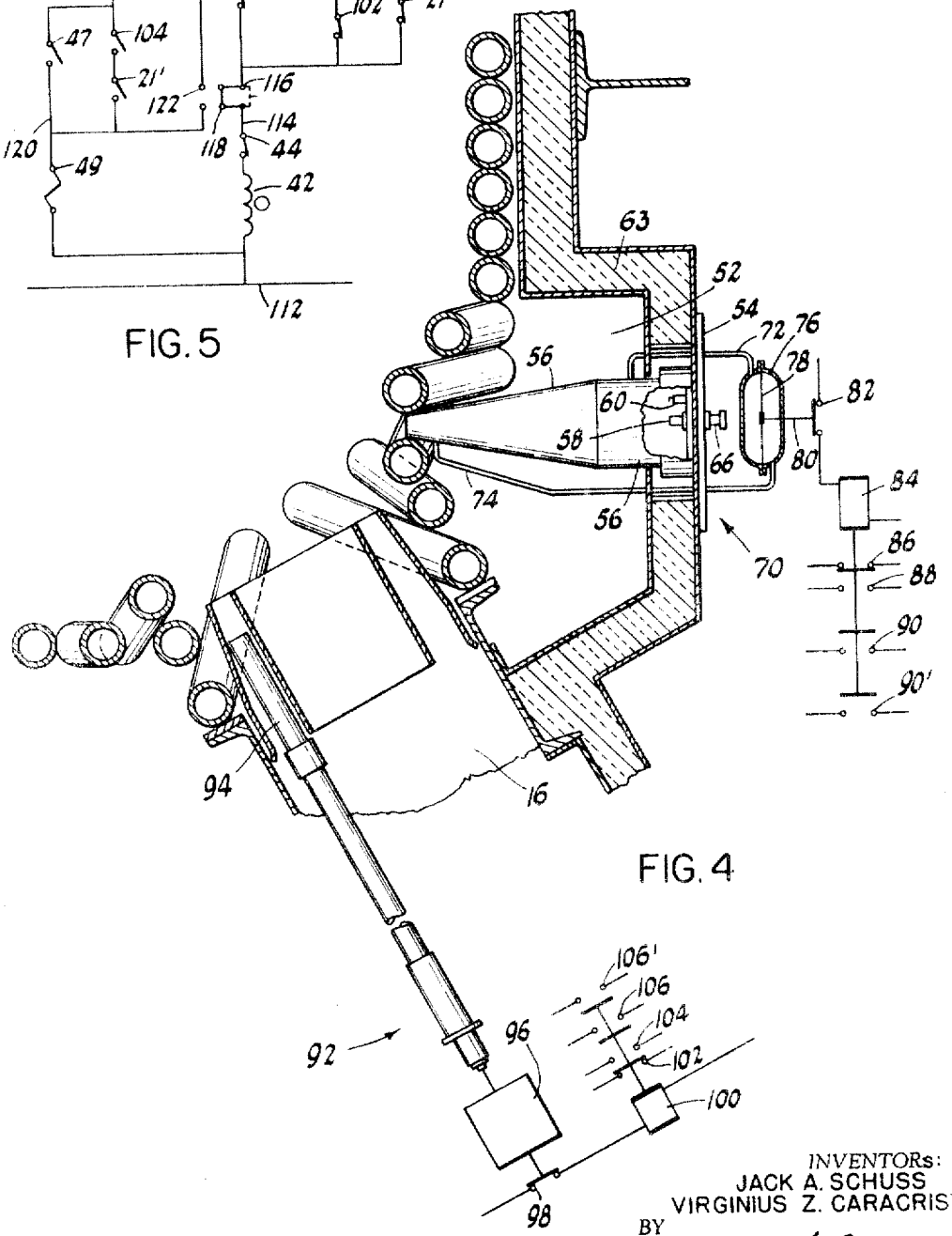
FIG. 4 is an enlarged plan view of one of the corners of the furnace shown in FIG. 2 in which is illustrated a typical burner installation incorporating an igniter, igniter sensor and flame scanner organization as contemplated by the present invention.

FIG. 4 illustrates a typical burner assembly at one of the corners in the furnace 12. It comprises a burner 16 mounted in the corner of the furnace 12 having means associated therewith to permit the admission of fuel and air for burning. Closely adjacent to the burner 16 is mounted an igniter torch assembly 52 which comprises a mounting plate 54, torch head 56, nozzle 58, and spark plug 60. The mounting plate 54 supporting the igniter torch 52 is attached to the furnace casing 63. Fuel is admitted to the nozzle 58 through an inlet line 66 which contains a diffusing element or atomizer for effecting the diffusion of fuel piror to its emergence from the nozzle 58 and ignition by the spark plug 60. The igniter torch 52 is oriented with respect to the burner 16 such that the flame produced by the ignition of fuel admitted thereto is directed into the path of the combustion elements issuing from the burner 16 so as to effect their ignition.

The operation of the vapor generator thus far described is as follows: Fuel, which may take the form of oil, gas or the like, is admitted through the main fuel line 22 when the main supply valve 24 is in an open position. Header 20 effects distribution of the fuel to each of the fuel supply lines which have interposed therein independently operable supply valves 28 controlling the admission of fuel to each of the burners 16. The fuel admitted to the burners is ignited by the pilot torches 52 thereby producing a flame and gases of combustion within the furnace chamber 12. At the same time, vaporizable fluid in the form of water is admitted to the tubes 14 and caused to flow therethrough extracting heat from the combustion gases to thereby effect a transformation of the fluid into vapor. The amount of vapor generated within the tubes 14 depends on the number of burner elevations which are put into operation with the generator's total capacity being developed when all of the elevations I, II and III are operable and lesser amounts being generated with a lesser number of elevations operating.

The present invention contemplates providing means to prevent the possibility of permitting unburnt fuel to accumulate within the furnace chamber 12 where it would subject the unit to the possibility of explosion. This means includes control of the admission of fuel to each of the individual burners of a multi-burner system during one portion of the operative cycle of the vapor generator and control of the admission of fuel to all of the burners of said system in response to the overall condition of the furnace during the remaining portion of the operative cycle. By means of the present organization the entire operation of the generator is subject to control by the system thereby enhancing the overall safety of the generator operation.

The control system organization is predicated upon certain factors. First, once the fuel loading of the burners reaches a certain point and ignition thereof has been achieved, there will exist within the furnace chamber a fireball of sufficient volume to ignite the fuel issuing from any burner even though its individual source of ignition has been removed. This point is taken to be 30 percent of burner capacity. Second, the fireball can be maintained at a sufficient volume as long as at least two of the burners of a given elevation in the hereindisclosed burner system are firing. Therefore, fuel issuing from all of the burners of every elevation can be ignited by the fireball created by two of the four burners of any single elevation.

The control system includes a monitoring system for determining the flame conditions of the furnace and burner system and means activated thereby to discontinue the admission of fuel to the burners when the flame conditions so require. The monitoring system employed to oversee the operation of the vapor generator comprises a pair of completely independent monitors associated with each of the burners capable of monitoring the condition of the burner and creating an electrical signal adapted to produce the desired control function. One of the monitors is a pressure differential measuring device, generally indicated as 70 which is adapted to register the pressure differential existing within the igniter head 56 to determine the amount of ignition energy available therein with which to ignite the adjacent burner 16. The measuring device contemplated in the preferred embodiment of the invention is as described in U.S. application Serial No. 205,483 to Livingston, filed June 19, 1962, now Patent No. 3,123,027, granted March 3, 1964. It comprises a pair of pressure taps 72 and 74 which communicate with the igniter head 56 at spaced points therealong. One tap 72 communicates with the head 56 at a point adjacent the nozzle 58 and the other tap 74 communicates with the head at a point adjacent the mouth thereof. The two pressure taps 72 and 74 communicate with a pressure differentiating chamber 76 on either side of a diaphragm 78 retained therein. To the diaphragm 78 is attached an arm 80 adapted to close contacts 82 which effect actuation of a multiplying relay 84. The relay 84 serves to close contacts 86 indicating that there is sufficient ignition energy with which to ignite the burner 16 or that the igniter is "on" and contacts 88, 90 and 90' which are closed by the relay 84 being in its deactuated position indicating the absence of sufficient ignition energy in the igniter 52 or that the igniter is "off." Contacts 86 and 88 are those contained in the control circuit shown in FIG. 5 pertaining to the individual burner control system and contacts 90 and 90' are those contained in the control circuit shown in FIG. 6 pertaining to the overall generator control system.

The other monitoring device generally indicated as 92 is an optical flame scanner arranged within the burner 16 such that its line of sight is oriented so as to enable it to register the existence or nonexistence of flame at the mouth of the burner through circuitry as described in U. S. application Serial No. 235,098 to Gilbert filed November 2, 1962, of the same assignee. The flame scanner 92 comprises a photo-sensitive electron tube 94 mounted adjacent to the mouth of the burner 16 and a receiver 96 which is capable of transforming the electric signal received from the electron tube 94 into means effective to close contacts 98 which, in turn, effect actuation of a multiplying relay 100. The relay 100 is so arranged as to close contact 102 in its actuated position indicating the presence of flame at the mouth of the burner 16 or that the burner is "on" and to close contacts 104, 106 and 106' in its deactuated position indicating the absence of flame or that the burner is "off." Contacts 102 and 104 are those contained in the circuitry employed in the individual burner control system of FIG. 5 and contacts 106 and 106' are those contained in the circuitry employed in the overall burner control circuit of FIG. 6.

Figure 5:
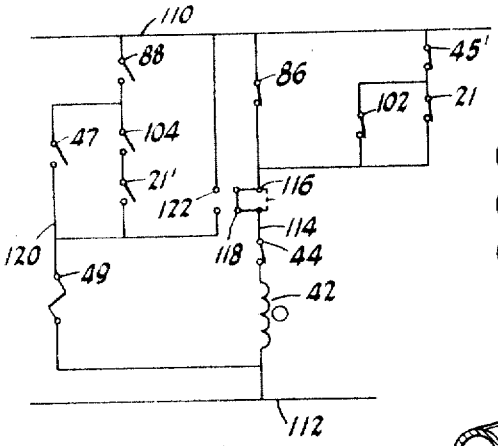
FIG. 5 is a wiring diagram of the control system utilized in effecting the individual burner protection concept in accordance with the present invention.
Figure 6:
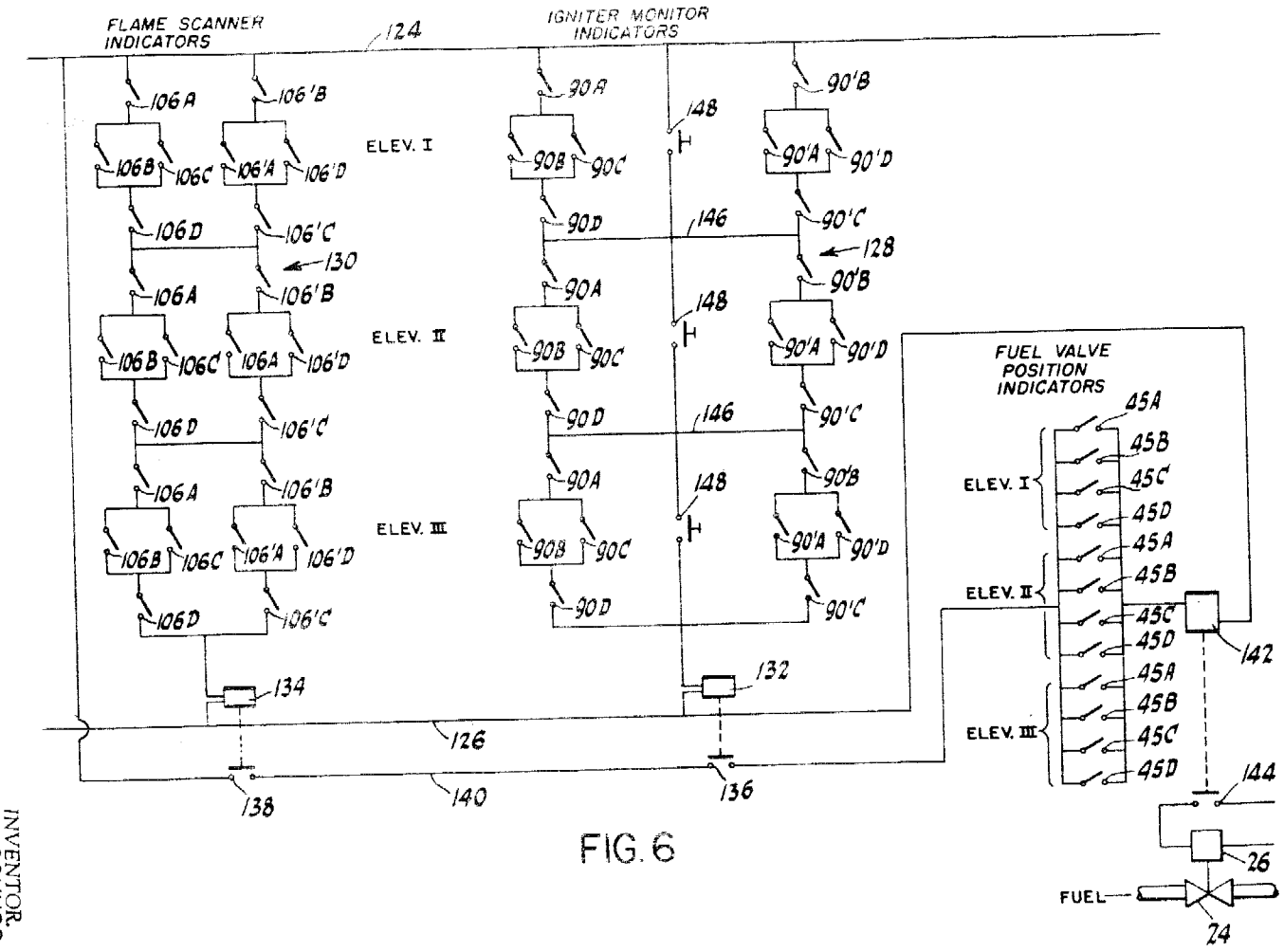
FIG. 6 is the wiring diagram employed in organizing the components of the control system utilized in monitoring the overall operation of the generator in accordance with the present invention.

The control circuits illustrated in FIGS. 5 and 6 are those employed to control the admission of fuel to the burner 16 during the three significant phases of vapor generator operation, the first phase being the initial start-up of the burners 16 during which time it is imperative that the igniters 52 exhibit sufficient ignition energy to light off the fuel admitted to the burners. This phase of generator operation is governed by the individual burner control system, the circuitry of which is shown in FIG. 5. The purpose of this system is to insure that no fuel will be admitted to the burners 16 until such time as the respective igniters 52 associated with each of the burners is providing sufficient ignition energy with which to ignite such fuel as determined by the igniter sensor 70. When the sensor 70 determines that there is sufficient ignition energy at the igniter 52, the fuel supply valve 28 associated with the burner 16 is permitted to open thereby admitting fuel to the burner. When the valve 28 becomes fully open, the arrangement of this portion of the control system permits the valve to remain open provided any one of the following conditions exist: that the igniter sensor 70 continues to show sufficient ignition energy in the igniter 52, that the optical flame scanner 92 witnesses the existence of flame at the burner 16 or that the pressure switch 20' in the main fuel header 20 is closed indicating that the load on the burner is at least as great as 30 percent of the rated burner load.

With reference now to FIG. 5 the circuitry involved consists of power supply leads 110 and 112 and a line 114 containing the motor 42 for the fuel supply valve actuator 30 for the valve 28. All of the valves 28 in the system contain a similar circuit so that, in order to avoid repetition, only one circuit will be described here. The line 114 contains contacts 116 which may be manually closed by means of a double pole, double throw switch 118 or the circuit may be completed by an equivalent contact closure by means of a signal received from a computer (not shown). Connected in series with the contacts 116 are contacts 86 and 44, contacts 86 being those which are closed when the igniter sensor 70 indicates the presence of the proper amount of ignition energy in the igniter to ignite the burner 16 and contacts 44 being those associated with the fuel supply valve 28 shown in FIG. 3 indicating that the valve is fully open. Contacts 45 which are also associated with the valve stem 34 to be closed when the valve is fully open are parallelly related with the contacts 86. In series with the contacts 45 are parallelly connected contacts 21 and 102, contacts 102 being those associated with the optical flame scanner 92 indicating when closed that the electron tube 94 witnesses the presence of flame at the mouth of the burner 16 and the contacts 21 being those which are closed when the pressure switch in the main header 20 senses a fuel pressure therein which is at least as great as 30 percent of that pressure associated with rated burner load. By means of this arrangement, the valve actuator motor 42 is operable initially after the control switch 118 closes contacts 116 only when the igniter sensor 70 determines that there is sufficient ignition energy to ignite the burner 16 and thereafter, once the fuel supply valve 28 reaches its full open position and contacts 45' are closed the valve can remain open if either the igniter remains on or the optical flame scanner 92 manifests the presence of flame at the mouth of the burner 16 or the fireball within the furnace chamber 12 is of a sufficient size to reignite the fuel issuing from the burners 16 should their source of independent ignition be removed.

In order to close the valve 28, it being of the energize to open energize to close type, the solenoid 49 must be actuated to open the relief valve 48 in the actuator 30 of the fuel supply valves 28. To accomplish this the alternate circuit shown as line 120 containing solenoid 49 is provided in parallel with line 114. It contains contacts associated with the same apparatus as are represented in line 114 but which are closed upon the existence of conditions which represent the opposite of those covered by the contacts in line 114. As shown, line 120 contains contacts 122 which are associated with the control switch 118 and closed when it is desired to close the valve 28 manually or upon a signal received from a computer. In parallel with the contacts 122 are contacts 88, connected in series with the parallel arrangement containing contacts 47, 104 and 21'. Contacts 88 are those which are closed when the igniter sensor 70 indicates that the ignition energy available at the igniter is insufficient to ignite the associated burner. Contacts 47 are those associated with the valve 28 which is normally closed until the valve reaches its fully open position and contacts 104 are those associated with the optical flame scanner 92 and closed when the scanner experiences a condition of "no-flame" at the burner. Contacts 21' are those that are closed when the pressure switch in the main header 20 experiences a fuel pressure representative of less than 30 percent of rated burner capacity.

A circuit diagram for the overall generator control system is illustrated in FIG. 6. Like contacts have been designated by like numerals but are suffixed by an appropriate designation of the corner of the furnace in which the associated burner is located. Lines 124 and 126 are the power supply leads across which are connected in parallel the igniter sensor circuit and the optical flame scanner circuit designated generally as 128 and 130 respectively and line 140 in which is located a bank of parallelly connected contacts 45 associated with the fuel supply valves 28 in such a manner as to be closed when the valve achieves a full open position. Connected in series with this bank of contacts 45 are contacts 136 and 138 associated with the igniter sensor circuit 128 and the optical scanner circuit 130 which are closed upon actuation of relays 132 and 134 as governed by the monitoring circuits 128 and 130. Also connected in series in line 140 is a relay 142 the actuation of which serves to close contacts 144 operating the main fuel supply valve actuator 26 to close the valve 24.

The igniter sensor circuit 128 comprises a series-parallel circuit arrangement in which are contained the contacts 90 and 90' associated with the igniter sensor relay 84 which is actuated when the igniter sensor 70 registers the absence of sufficient ignition energy with which to ignite the adjacent burner 16. The circuit 128 extends from the lead 124 to the lead 126 terminating at the latter in relay 132 which is actuated upon completion of the circuit. This circuit 128 comprises a series-parallel arrangement of the contacts 90 and 90', the closure of which is governed by the relays 84 operated by the igniter sensors 70 associated with the four corners A, B, C and D of each elevation I, II and III. The series-parallel arrangement shown permits a closure of the circuit across the respective elevational portions thereof as long as the igniter sensors 70 associated with any three of the four burners which are located in the elevation exhibit an insufficient amount of ignition energy. Included in this circuit are lines 146 which create avenues of passage for the electric current through each of the elevational portions of the circuit to the relays 132. Connected across each of the elevational portions in parallel with the series-parallel arrangement of contacts 90 and 90' are contacts 148 which are associated with the control switches which can either be manually operated or receive its actuation from a computer signal the closure of which is effected when it is desired to remove a particular burner elevation from service or to remove the igniters of an elevation for maintenance purposes to short circuit that elevational portion of the circuit 128 which is equivalent to the igniter sensors' registering an insufficient amount of ignition energy in that elevation.

The short circuiting of that elevational portion of the igniter sensor circuit 128 which is removed from service is necessary because the igniter flames for any one burner elevation are not sufficient to ignite fuel which issues from the burners of another elevation. Therefore, that portion of the control circuit associated with such igniters must indicate that the igniters are incapable of igniting any fuel admitted to other burners.

The optical flame scanner circuit 130 is similar to the igniter sensor circuit 128 in that the same series-parallel arrangement of contacts 106 and 106' exists. As in the circuit 128, this arrangement of the contacts 106 and 106' which are actuated by the relays 100 associated with each of the optical flame scanners 92 effects a closure of the circuit in that elevational portion of the generator when the optical flame scanners associated with any three of the four burners located in that elevation experience the absence of flame in the burner 16.

The operation of the complete control system is as follows: during startup of the generator each of the burners 16 is governed by their respective individual burner control circuits such as that shown in FIG. 5. When it is desired to place a burner in operation, the control switch 118 must first be actuated to close contacts 116. If the igniter sensor 70 associated with that burner exhibits the presence of sufficient ignition energy in the igniter 52 with which to ignite the burner once fuel is admitted thereto, contact 86 will be closed thereby permitting the flow of current to the valve actuator motor 42 and contact 88 will be open thereby deactuating the solenoid 49 closing the internal relief valve 48 thus permitting the valve 28 to open. Once the valve 28 is open, the second phase of the control function comes into play with the closure of contacts 45 and opening of the contacts 47 associated with the various fuel supply valves 28. During this phase the fuel supply valves 28 will remain open as long as either there is sufficient ignition energy being provided by the igniter 52 thereby keeping contacts 86 closed and contacts 88 open or the optical flame scanner associated with the burner 16 experiences the presence of flame at the burner thereby effecting the closure of contacts 102 and the opening of contacts 104 or the pressure within the main header 20 indicates that the burner load is at least 30 percent of rated burner capacity in which case the ball of fire or flame envelope within the furnace chamber is of a sufficient size to maintain ignition of the fuel being admitted to the burners thereby effecting closure of contacts 21 and opening of contacts 21'. If, on the other hand, none of these conditions exist, the circuit contained in alternate line 120 will be closed and the circuit in line 114 will be open thereby effecting immediate closure of the valve 28. With the opening of any valve 28, contacts 45 associated with that valve are closed thereby putting into operation the overall generator control circuit shown in FIG. 6.

When the contacts 45 are closed putting the overall generator control circuit initially into operation, the individual burner control circuits shown in FIG. 5 continue to primarily govern the operation of the fuel supply valves 28 until and unless the contact 21 associated with the pressure switch 19 is closed with the overall generator control circuit serving as a backup system to close the main fuel valve 24 to discontinue operation of the entire generator only in case of a total flameout. Upon closure of contacts 21, however, the generator undertakes the third phase of its operation this being the phase in which the fireball within the furnace chamber 12 is of a large enough volume to insure reignition of the fuel admitted to the burners 16 should they lose their independent sources of ignition. At this time control of the fuel admission to the generator through the valve 24 is undertaken exclusively by the overall generator control circuit. Control of the generator in accordance with this concept is embodied in the circuitry shown in FIG. 6 and relies on the monitoring of each burner in the generator by both the igniter sensor 70 and the optical flame scanner 92. To discontinue operation of the vapor generator during this phase the control system must indicate that all of the burners in each elevation have been extinguished. However, in order to prevent the failure of control system operation due to some component failure on the unsafe side, i.e. where the monitors indicate the presence of flame when none in fact exists, the control system is so organized that there will be an indication of total flameout in each elevation when the monitors associated with any three of the four burners located in each elevation indicate an absence of flame. There is thus provided a 25 percent margin of safety against component failure on the unsafe side. Moreover, there must be a flameout manifest in all of the burner elevations before the control system is operative to close the main fuel supply valve 24. The series-parallel arrangement of contacts 90 and 90' for each of the burner elevations in circuit 128 permits the closure of the circuit when the igniters associated with three of the four burners experience an absence of flame. For example, assuming corners A, B and C in elevation I, corners A, C and D in elevation II and corners B, C and D in elevation III have ceased to fire. Should this happen, contacts 90A, 90B, 90C, 90'A, 90'B and 90'C in elevation I would be closed thereby effecting closure of the circuit through contacts 90'B, 90'A and 90'C; in elevation II contacts 90A, 90C, 90D, 90'A, 90'C and 90'D would be closed thereby establishing closure of the circuit through contacts 90A, 90C and 90D; and in elevation III contacts 90B, 90C, 90D, 90'B, 90'D and 90'C would be closed thereby establishing closure of the circuit through contacts 90'B, 90'D and 90'C. There is thus established a closure of the circuit through contacts 90'B, 90'A and 90'C in elevation I, 90A, 90C and 90D in elevation II and 90'B, 90'D and 90'C in elevation III to effect actuation of the relay 132 thereby closing contacts 136 in line 140.

Similarly with regard to the optical flame scanner circuit 130, in elevation I contacts 106A, 106B, 106C, 106'A, 106'B and 106'C will be closed establishing a complete circuit across elevation I through contacts 106'B, 106'A and 106'C; in elevation II contacts 106A, 106C, 106D, 106'A, 106'C and 106'D would be closed establishing a completed circuit across elevation II through contacts 106A, 106C and 106D; in elevation III contacts 106B, 106C, 106D, 106'B, 106'C and 106'D will be closed establishing completion of the circuit across elevation III through contacts 106'B, 106'D and 106'C thereby effecting actuation of relay 134 and closure of contacts 138 in line 140. With the closure of contacts 136 and 138 in line 140 there is established a completed circuit through that line thus permitting the passage of current from the live lead 124 to actuate the relay 142 thereby closing contacts 144 to effect actuation of the main fuel valve operator 26 which effects closure of the main fuel supply valve 24. Closure of the main fuel supply valve 24 effects a discontinuation of the admission of fuel to all of the burners 16 in the generator thereby effecting a total shutdown of the unit.

When it is desired to operate the generator under conditions of partial load with only one or two of the burner elevations in operation, that portion of the igniter sensor circuit 128 associated with the elevation which has been removed from service will be short-circuited by closure of contacts 148 even though the associated igniters are on. This closure will be effected by means of a manual control switch as shown in FIG. 6 or by means of a signal received from the computer. Short-circuiting that portion of the circuit 128 simulates the registration of a "no-fire" condition by the igniter flame sensors 70 related to the burners in that elevation. The remaining portions of the circuit are operable as was described above so that a cessation of flame in any of the operating burner elevations will effect actuation of the relay 132. The optical flame scanner circuit 130 requires no comparable short-circuiting provisions due to the fact that it involves line of sight devices which will naturally register "no-flame" with viewing the burners of an elevation that is not in service.

From the foregoing description it can be seen that the present burner control system provides a highly efficient means for safeguarding the operation of a vapor generator against explosion. The system is operable through each phase of the generator operation cycle to prevent the creation of an explosive atmosphere within the furnace chamber. Moreover, the present organization furnishes a means for automatically initiating the admission of fuel to the burners only when the igniters are capable of igniting it and also discontinuing the admission of fuel to the burners when it becomes evident that there is insufficient ignition energy by which it can be ignited.

The arrangement of components is such that removal of a generator from service will occur only when furnace conditions so require and not because of component malfunction. Means are additionally provided to effect shutdown of the generator even though component malfunction may be such as would tend to continue the admission of fuel to the burners in spite of the fact that there is no ignition energy with which to ignite it.

There is thus provided a simple, yet highly flexible control system for use in a multiburner vapor generator capable of automatically preventing the creation of an explosive atmosphere within a furnace chamber over a broad range of generator operation.

While particular embodiments have been described and illustrated, various modifications may obviously be made without departing from the true spirit and scope of the invention which is defined by the appended claims.

What is claimed is:

1. The combination of a furnace chamber; a burner adapted to fire in said furnace chamber; a fuel line connecting said burner to a fuel source; a valve interposed in said fuel line; a signal responsive valve operator adapted to open and to close said valve; an igniter for igniting said burner; first sensing means adapted to emit a signal when the ignition energy output of said igniter is sufficient to ignite the fuel admitted to said burner; second sensing means associated with said burner adapted to emit a signal when said burner exhibits a flame; third sensing means associated with said valve adapted to emit a signal when said valve is substantially fully open; means connecting said sensing means and said operator for opening said valve upon receipt by said operator of a signal from said first sensing means and means for holding said valve open upon receipt of a signal from said second and third sensing means.

2. The combination of a furnace chamber; a burner adapted to fire in said furnace chamber; a fuel line connecting said burner to a fuel source; a valve interposed in said fuel line; operator means adapted to open and to close said valve; an igniter for igniting said burner; first sensing means including a normally open switch adapted to close when the ignition energy output of said igniter is sufficient to ignite the fuel admitted to said burner; second sensing means including a normally open switch adapted to close when said burner exhibits a flame; third sensing means including a normally open switch adapted to close when said valve is fully open; circuit means containing said switches for actuating said operator including a line for opening said valve upon closure of the switch associated with said first sensing means and a line for holding said valve open upon the simultaneous closure of the switches associated with said second and third sensing means.

3. The combination of a furnace chamber; a burner adapted to fire in said furnace chamber; a fuel line connecting said burner to a fuel source; a valve interposed in said fuel line; operator means adapted to open and to close said valve; an igniter for igniting said burner; first sensing means comprising a pressure differential sensor associated with said igniter and a normally open switch adapted to close when the igniter pressure differential is such as to indicate the presence of sufficient ignition energy to ignite fuel admitted to said burner; second sensing means comprising an optical flame scanner and a normally open switch adapted to close when said flame scanner views flame at said burner; third sensing means including a normally open switch adapted to close when said valve is fully open; circuit means containing said switches for actuating said operator including a line for opening said valve upon closure of the switch associated with said first sensing means and a line for holding said valve open upon the simultaneous closure of the switches associated with said second and third sensing means.

4. The combination of a furnace chamber; a burner adapted to fire in said furnace chamber; a fuel line connecting said burner to a fuel source; a valve interposed in said fuel line; operator means adapted to open and to close said valve; an igniter for igniting said burner; first sensing means comprising a pressure differential sensor associated with said igniter and a normally open switch adapted to close when the igniter pressure differential is such as to indicate the presence of sufficient ignition energy to ignite fuel admitted to said burner; second sensing means comprising an optical flame scanner and a normally open switch adapted to close when said flame scanner views flame at said burner; third sensing means including a normally open switch adapted to close when said valve is fully open; circuit means to actuate said operator for opening said valve including a line containing the switch associated with said first sensing means in parallel connection with the switches associated with said second and third sensing means.

5. In a burner system for a vapor generator having a furnace chamber, a plurality of fuel burners operative to fire in said furnace chamber, fuel lines connecting said burners to a fuel source; valves associated with each of said burners in said fuel lines; an operator associated with each of said valves adapted to open and to close said valves; an igniter associated with each of said burners for providing ignition energy to the fuel supplied thereto, a control system for operating each of said valves comprising first sensing means associated with each of said igniters including a first normally open switch that closes when said igniter exhibits sufficient ignition energy to ignite the associated burner and a second normally open switch that closes when said igniter exhibits insufficient ignition energy, second sensing means associated with each of said burners including a first normally open switch that closes when said burner is lighted and a second normally open switch that closes when said burner is not lighted, third sensing means associated with each of said valves including a first limit switch that closes when the associated valve is fully open and a second limit switch that closes when the associated valve is not fully open, a first circuit for actuating the associated operator to open its valve containing said first switch of said first sensing means, a second circuit for actuating the associated operator to open its valve independent of said first circuit containing said first switches of said second and third sensing means connected in series, a third circuit for actuating the associated operator to close its valve containing said second switches of said first and second sensing means in series and a fourth circuit for actuating the associated operator to close its valve containing said second switches of said first and third sensing means in series.

6. In a burner system for a vapor generator having a furnace chamber, a plurality of fuel burners operative to fire in said furnace chamber; fuel lines connecting said burners to a fuel source; valves associated with each of said burners in said fuel lines; an operator associated with each of said valves adapted to open and to close said valves; an igniter associated with each of said burners for providing ignition energy to the fuel supplied thereto; a control system for independently operating each of said valves comprising first sensing means associated with each of said igniters including a pressure differential sensor, a first normally open switch that closes when said igniter exhibits sufficient differential pressure to indicate sufficient ignition energy to ignite the associated burner and a second normally open switch that closes when said igniter exhibits insufficient differential pressure; second sensing means associated with each of said burners including an optical flame scanner, a first normally open switch that closes when the associated flame scanner views a flame and a second normally open switch that closes when said flame scanner views no flame; third sensing means associated with each of said valves including a first normally open limit switch that closes when the associated valve is fully open and a second normally open limit switch that closes when the associated valve is not fully open; a control circuit associated with each of said operators including a first line for actuating the associated operator to open its valve containing said first switch of said first sensing means, a second line for actuating said operator to hold its valve open containing said first switches of said second and third sensing means connected in series, a third line for actuating said operator to close said valve containing said second switch of said first sensing means connected in series with the parallelly connected second switches of said second and third sensing means.

7. A vapor generator having a furnace, a plurality of burners operative to fire into said furnace, a fuel source for supplying fuel to said burners, fuel lines connecting said burners with said fuel source, valve means in said fuel lines between said burners and said fuel source, electrically actuable operator means associated with said valve means, igniter means associated with each of said burners providing ignition energy therefor, a control system comprising first sensing means associated with each igniter to indicate the presence of a sufficient amount of ignition energy to ignite said burners, switch means associated with each of said first sensing means actuable when there is insufficient ignition energy to ignite said burners, second sensing means associated with each burner to indicate the absence of flame thereat, switch means actuable by each of said second sensing means when there is no flame at the corresponding burner, electric circuit means including a first line containing parallelly connected limit switches associated with said valve means actuable to a closed position when said valve means are open, a second line in parallel with said first line containing contacts of said first sensing means actuable switches arranged to define a closed circuit when a predetermined number of said first sensing means actuable switches are actuated, a first relay connected in said second line and actuated upon establishment of a closed circuit through said first sensing means actuable switches, a contact adapted to be closed by said first relay connected in series with said limit switches, a third line in parallel with said first and second lines containing contacts of said second sensing means actuable switches arranged to define a closed circuit when a predetermined number of said second sensing means indicate the absence of flame, a second relay connected in said third line and actuated upon establishment of a closed circuit through said second sensing means actuable switches, a contact connected in series with said limit switches and said first relay contact adapted to be closed by said second relay, and a third relay connected in series with the contacts associated with said first and second relays adapted to close a contact to actuate said operator means thereby closing said valve means.

8. A vapor generator having a furnace, a plurality of burners operative to fire into said furnace, fuel lines connecting said burners to a fuel source, a main valve upstream of said fuel lines, valves associated with each of said burners in said fuel lines, an electrically actuable operator associated with said main valve, igniter means associated with each of said burners providing ignition energy therefor, a control system comprising first sensing means including a pressure differential sensor associated with each igniter and switch means actuated by said pressure differential sensors when there is insufficient ignition energy to ignite the associated burner, second sensing means including an optical flame scanner associated with each of said burners and switch means actuated by said flame scanners when there is no flame at the corresponding burner, electrical circuit means including a first line containing parallelly connected contacts associated with limit switches on said valves actuable to close when the corresponding valve is open, a second line connected in parallel with said first line containing contacts of said pressure differential actuable switches arranged to define a closed circuit when a predetermined number of said pressure differential actuable switches are actuated, a first relay connected in said second line and actuated upon establishment of a closed circuit through said pressure differential actuable switches, a contact adapted to be closed by said first relay connected in series with said limit switch contacts, a third line in parallel with said first and second lines containing contacts of said flame scanner actuable switches arranged to define a closed circuit when a predetermined number of said flame scanners indicate the absence of flame, a second relay connected in said third line and actuated upon establishment of a closed circuit through said flame scanner actuable switches, a contact connected in series with said limit switches and said first relay contact adapted to be closed by said second relay and a third relay connected in series with the contacts associated with said first and second relays adapted to close a contact thereby closing said main valve.

9. In a burner system for a vapor generator having a furnace chamber, a plurality of fuel burners operative to fire in said furnace chamber, a main fuel line, fuel lines connecting said burners to said main fuel line, a main valve in said main fuel line, secondary valves in said secondary fuel lines associated with each of said burners; an electrically actuable operator associated with said main valve; electrically actuable operators associated with each of said burner valves adapted to open and to close said burner valves, igniters associated with each of said burners providing ignition energy therefor, a control system for automatically operating said burners comprising first sensing means associated with each of said igniters including first normally open switch means adapted to close when the associated igniter exhibits sufficient ignition energy to ignite its corresponding burner and second normally open switch means adapted to close when the associated igniter exhibits insufficient ignition energy; second sensing means associated with each of said burners including a first normally open switch means adapted to close when the associated burner exhibits a flame and second normally open switch means adapted to close when said burner exhibits no flame; third sensing means associated with each of said burner valves including normally open switch means adapted to close when the corresponding valve is fully open; fourth sensing means operable to measure fuel pressure in said main fuel line including a first normally open switch means adapted to close when the fuel pressure is such as to indicate the presence of a flame envelope in said furnace chamber and a second normally open switch means adapted to close when the fuel pressure is below that required for a flame envelope in said furnace; first circuit means adapted to independently actuate each of said burner valve operators to open the corresponding burner valve including, first lines connecting each of said operators to a source of power containing said first switch of said first sensing means of the corresponding burner; second lines connecting each of said operators to a source of power including said first switches of said second sensing means and said third sensing means switches; second circuit means adapted to be operable upon closure of the switch means associated with said fourth sensing means, said second circuit means including a first line containing parallelly connected contacts associated with said switch means of said third sensing means, a second line connected in parallel with said first line containing contacts associated with said second switch means of said first sensing means arranged to define a closed circuit when a predetermined number of said switch means are actuated, a first relay connected in said second line and actuated upon establishment of a closed circuit through said second switch means of said first sensing means, a contact adapted to be closed by said first relay connected in series with said switch means of said third sensing means, a third line in parallel with said first and second lines containing contacts of said second switch means of said second sensing means arranged to define a closed circuit when a predetermined number of said switch means are actuated, a second relay connected in said third line and actuated upon establishment of a closed circuit through said second switch means of said second sensing means, a contact connected in series with said switch means of said third sensing means and said first relay contact adapted to be closed by said second relay and a third relay connected in series with the contacts associated with said first and second relays adapted to close a contact to actuate the operator of said main valve to close said main valve.

10. In a burner system for a vapor generator having a furnace chamber, a plurality of fuel burners operative to fire in said furnace chamber, a main fuel line, secondary fuel lines connecting said burner to said main fuel line, a main valve in said main fuel line, burner valves associated with each of said burners in said secondary fuel lines, electrically actuable operators associated with said main valve and said burner valves adapted to open and to close said valves, igniters associated with each of said burners providing ignition energy therefor, the improvement comprising a control system for automatically operating said burners, said system including igniter sensors associated with each igniter to register the amount of ignition energy developed thereby having first switch means actuable by each of said igniter sensors when there is sufficient ignition energy to ignite said burners and second switch means actuable by each of said igniter sensors when there is insufficient ignition energy; flame scanners associated with each burner to indicate the presence of flame thereat having first switch means actuable by each of said flame scanners when there is a flame at the corresponding burner and second switch means actuable by each of said flame scanners when there is no flame at the corresponding burner; limit switches associated with each of said burner valves being actuable when the corresponding burner valve is open; a fuel pressure sensor in said main fuel line having first switch means actuable when the fuel pressure in said line is capable of supporting a flame envelope in said furnace chamber and a second switch means actuable when the fuel pressure is incapable of supporting a flame envelope; first circuit means operable upon actuation of the second switch means of said fuel pressure sensor adapted to independently actuate each of said burner valve operators to open the corresponding valve including a first line connecting each of said operators to a power source containing contacts of said first switch means of the corresponding igniter sensor and a second line connecting each of said operators to said power source including contacts of said first switch means of said igniter sensors and said flame scanners connected in series; second circuit means operable upon actuation of the first switch means of said fuel pressure sensor adapted to actuate said main valve operator including a first line containing parallelly connected contacts of said limit switches, a second line connected in parallel with said first line containing contacts associated with said second switch means of said igniter sensors arranged to define a closed circuit when a predetermined number of said switch means are actuated, a first relay connected in said second line and actuated upon establishment of a closed circuit through said igniter sensors second switch means, a contact adapted to be closed by said first relay connected in series with said limit switch contacts, a third line in parallel with said first and sec- lines containing contacts of said second switch means of said flame scanners arranged to define a closed circuit when a predetermined number of said switch means are actuated, a second relay connected in said third line and actuated upon establishment of a closed circuit through said flame scanners second switch means, a contact connected in series with said limit switch contacts and said first relay contact adapted to be closed by said second relay; and a third relay connected in series with said first and second relay contacts adapted to close a contact to actuate said main valve operator to close said main valve.

*11. In a vapor generator having a furnace, a plurality of burners operative to fire into said furnace, a main fuel line for supplying fuel to said burners, a main fuel supply valve in said main fuel line, burner fuel lines connecting said burners to said main fuel line, burner valves in said burner fuel lines, operator means associated with said burner valves, igniter means associated with each of said burners providing ignition energy therefor; a control system comprising first sensing means associated with each igniter to indicate the presence of a sufficient amount of ignition energy to ignite said burners, second sensing means associated with each burner to indicate the absence of flame thereat, circuit means operable to actuate said main fuel valve operator to close said valve, said circuit means including first circuit arming means actuated when at least one of said burner valves is open, second circuit arming means actuated when a predetermined number of said first sensing means indicate an insufficient amount of ignition energy to ignite their associated burners, third circuit arming means actuated when a predetermined number of said second sensing means indicate the absence of flame at their associated burners, and means operable to actuate said main fuel valve operator to close said main fuel valve only upon the cumulative actuation of said first, second and third circuit arming means.*

*12. A vapor generator having a furnace, a plurality of burners operative to fire into said furnace, a main fuel line for supplying fuel to said burners, a main fuel supply valve in said main fuel line, burner fuel lines connecting said burners with said main fuel line, burner valves in said burner fuel lines, electrically actuable operator means associated with said burner valve, igniter means associated with each of said burners providing ignition energy therefor; a control system comprising first sensing means associated with each igniter to indicate the presence of a sufficient amount of ignition energy to ignite said burners, second sensing means associated with each burner to indicate the absence of flame thereat, electric circuit means operable to actuate said main fuel valve operator to close said main fuel valve including means to pass electric current when at least one of said burner valves is open, means to pass electric current when a predetermined number of said first sensing means indicate an insufficient amount of ignition energy to ignite their associated burners, means to pass electric current when a predetermined number of said second sensing means indicate the absence of flame at their associated burners, and means operable to actuate said electric circuit means only upon the cumulative actuation of all of said electric current passing means.*

References Cited by the Examiner

The following references, cited by the Examiner, are of record in the patented file of this patent or the original patent.

UNITED STATES PATENTS

| | | | |
|---|---|---|---|
| 2,622,699 | 12/1952 | Caracristi | 158—28 |
| 2,635,813 | 4/1953 | Schlenz | 158—11 |
| 2,692,962 | 10/1954 | Thomson | 158—28 |
| 2,812,140 | 11/1957 | Gray | 158—28 |
| 2,986,209 | 5/1961 | Mittendorf | 158—28 |
| 3,051,227 | 8/1962 | Robson | 158—42.1 X |
| 3,055,416 | 9/1962 | Marshall | 158—28 |

JAMES W. WESTHAVER, *Primary Examiner.*